US006912690B2

(12) United States Patent
Bauchot

(10) Patent No.: US 6,912,690 B2
(45) Date of Patent: Jun. 28, 2005

(54) METHOD AND SYSTEM IN AN ELECTRONIC SPREADSHEET FOR PERSISTENTLY COPY-PASTING A SOURCE RANGE OF CELLS ONTO ONE OR MORE DESTINATION RANGES OF CELLS

(75) Inventor: Frederic Bauchot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 09/864,628

(22) Filed: May 23, 2001

(65) Prior Publication Data

US 2002/0049784 A1 Apr. 25, 2002

(30) Foreign Application Priority Data

Oct. 24, 2000 (EP) ............................................. 00480097

(51) Int. Cl.[7] .............................................. G06F 15/00
(52) U.S. Cl. ..................... 715/504; 715/503; 715/530
(58) Field of Search ................................ 715/503, 504, 715/500, 530

(56) References Cited

U.S. PATENT DOCUMENTS

| | | | | |
|---|---|---|---|---|
| 5,247,611 A | * | 9/1993 | Norden-Paul et al. ...... | 715/504 |
| 5,282,128 A | * | 1/1994 | Braude .......................... | 700/28 |
| 5,339,410 A | * | 8/1994 | Kanai ........................... | 707/100 |
| 5,359,729 A | * | 10/1994 | Yarnell et al. ................. | 707/2 |
| 5,418,902 A | * | 5/1995 | West et al. ................... | 715/503 |
| 5,819,293 A | * | 10/1998 | Comer et al. ................ | 707/203 |
| 5,970,506 A | * | 10/1999 | Kiyan et al. ................. | 715/503 |
| 6,112,214 A | * | 8/2000 | Graham et al. .............. | 715/503 |
| 6,138,130 A | * | 10/2000 | Adler et al. ................. | 715/503 |
| 6,157,934 A | * | 12/2000 | Khan et al. .................. | 715/503 |
| 6,317,758 B1 | * | 11/2001 | Madsen et al. .............. | 715/504 |
| 6,345,284 B1 | * | 2/2002 | Dinkelacker ................ | 715/530 |

(Continued)

OTHER PUBLICATIONS

Toman, The Amazing Data Connection, Journal of Accountancy, New York, May 1994, vol. 177, Iss. 5, pp. 63–68.*

Anonymous, Chart Noncontiguous Data in Quattro Pro, Inside Corel WordPerfect Suite, Louisville, Aug. 2000, vol. 6, Iss. 8, pp. 12–13.*

Savage, Document That Spreadsheet!, Management Accounting, Montvale, Nov. 1991, vol. 73, Iss. 5, pp. 52–57.*

Matthews, Excel for Windows 95, Fifth Edition, Osborne McGraw–Hill, pp. 150–152, 208–209.*

Boyce et al., Using Microsoft Office 97 Professional, Que Corporation, pp. 265–266, 268–269.*

Halberg, Using Microsoft Excel 97, Que Corporation, pp. 118–122, 587.*

Computimes Malaysia, Linking Spreadsheets with Excel, Jul. 12, 1999, p. 1.*

Cox et al., Using Visual Programming to Extend the Power of Spreadsheet Computation, ACM 1994, pp. 153–161.*

Anonymous, Linking Excel Data in Your Word Documents, Microsoft Word, Oct. 2000, vol 7, p. 1, 4 pgs.*

Walkenbach, Visual Baler Promises Quick Spreadsheets, InfoWorld, Oct. 24, 1994, vol 16, p. 101, 2 pgs.*

*Primary Examiner*—Stephen Hong
*Assistant Examiner*—Cong-Lac Huynh
(74) *Attorney, Agent, or Firm*—John R. Pivnichny; Dillon & Yudell LLP

(57) ABSTRACT

A system and method is disclosed for persistently copying and pasting a source range of cells of a multidimensional spreadsheet onto one or more destination ranges of cells. When the source cells are first copied and pasted, a persistent association is made between the source cells and the destination cells. Thereafter, whenever a cell in the source range is updated, the corresponding cells in the destination range are updated automatically.

20 Claims, 15 Drawing Sheets

U.S. PATENT DOCUMENTS

| | | | |
|---|---|---|---|
| 6,415,305 B1 * | 7/2002 | Agrawal et al. | 715/503 |
| 6,549,878 B1 * | 4/2003 | Lowry et al. | 715/503 |
| 6,579,324 B1 * | 6/2003 | Lowry et al. | 715/504 |
| 6,610,102 B1 * | 8/2003 | Aldred et al. | 715/509 |
| 6,687,875 B1 * | 2/2004 | Suzuki | 715/503 |
| 6,691,281 B1 * | 2/2004 | Sorge et al. | 715/503 |
| 6,725,422 B1 * | 4/2004 | Bauchot et al. | 715/503 |
| 2002/0007380 A1 * | 1/2002 | Bauchot et al. | 707/530 |
| 2002/0065848 A1 * | 5/2002 | Walker et al. | 707/511 |
| 2002/0080179 A1 * | 6/2002 | Okabe et al. | 345/769 |
| 2002/0080191 A1 * | 6/2002 | Savoie | 345/810 |
| 2002/0091728 A1 * | 7/2002 | Kjaer et al. | 707/503 |
| 2002/0116348 A1 * | 8/2002 | Phillips et al. | 705/400 |
| 2002/0138653 A1 * | 9/2002 | Ogura | 709/246 |
| 2003/0097381 A1 * | 5/2003 | Detweiler et al. | 707/201 |

* cited by examiner

FIG. 3A

|   | A | B | C | D | E | F | G | H | I | J | K |
|---|---|---|---|---|---|---|---|---|---|---|---|
| 1 | | | | | | | | | | | |
| 2 | ABC Corporation - Invoice template | | | | | | | Profit | | 50% | |
| 3 | | | | | | | | | | | |
| 4 | Reference | | Unit Cost | Quantity | | Currenty | Exchange Rate | | Price | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |

FIG. 3B

|   | A | B | C | D | E | F | G | H | I | J | K |
|---|---|---|---|---|---|---|---|---|---|---|---|
| 1 | | | | | | | | | | | |
| 2 | ABC Corporation - Invoice template | | | | | | | | | | |
| 3 | | | | | | | | | | | |
| 4 | Reference | | Unit Cost | Quantity | | Currenty | Exchange Rate | | Profit | Price | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |

FIG. 4

| Source Range | Destination Range | Source Pattern | Destination Pattern | 410 |
|---|---|---|---|---|
|  |  |  |  |  |
| 402 | 403 | 404 | 405 | 401 |
|  |  |  |  |  |

400

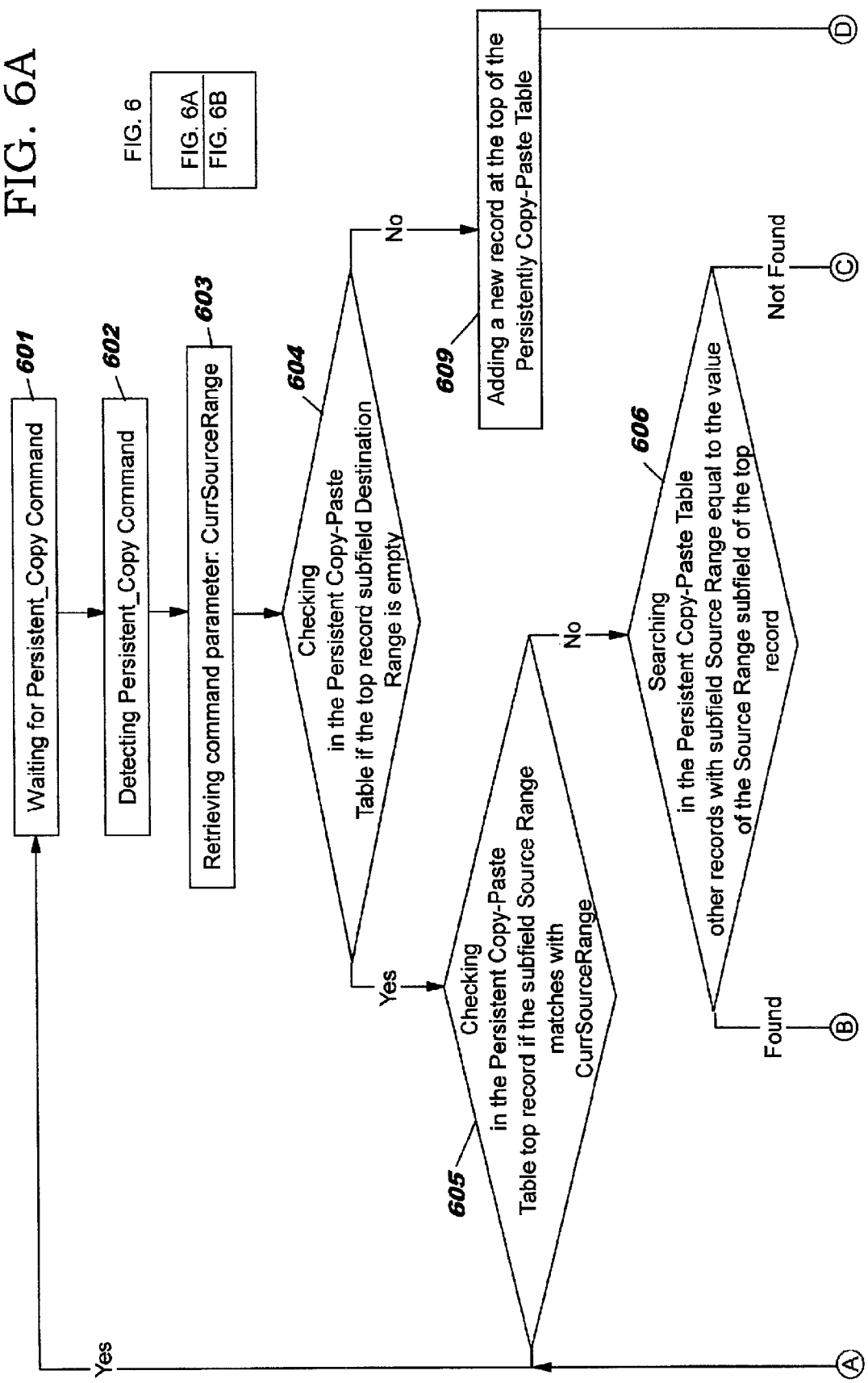

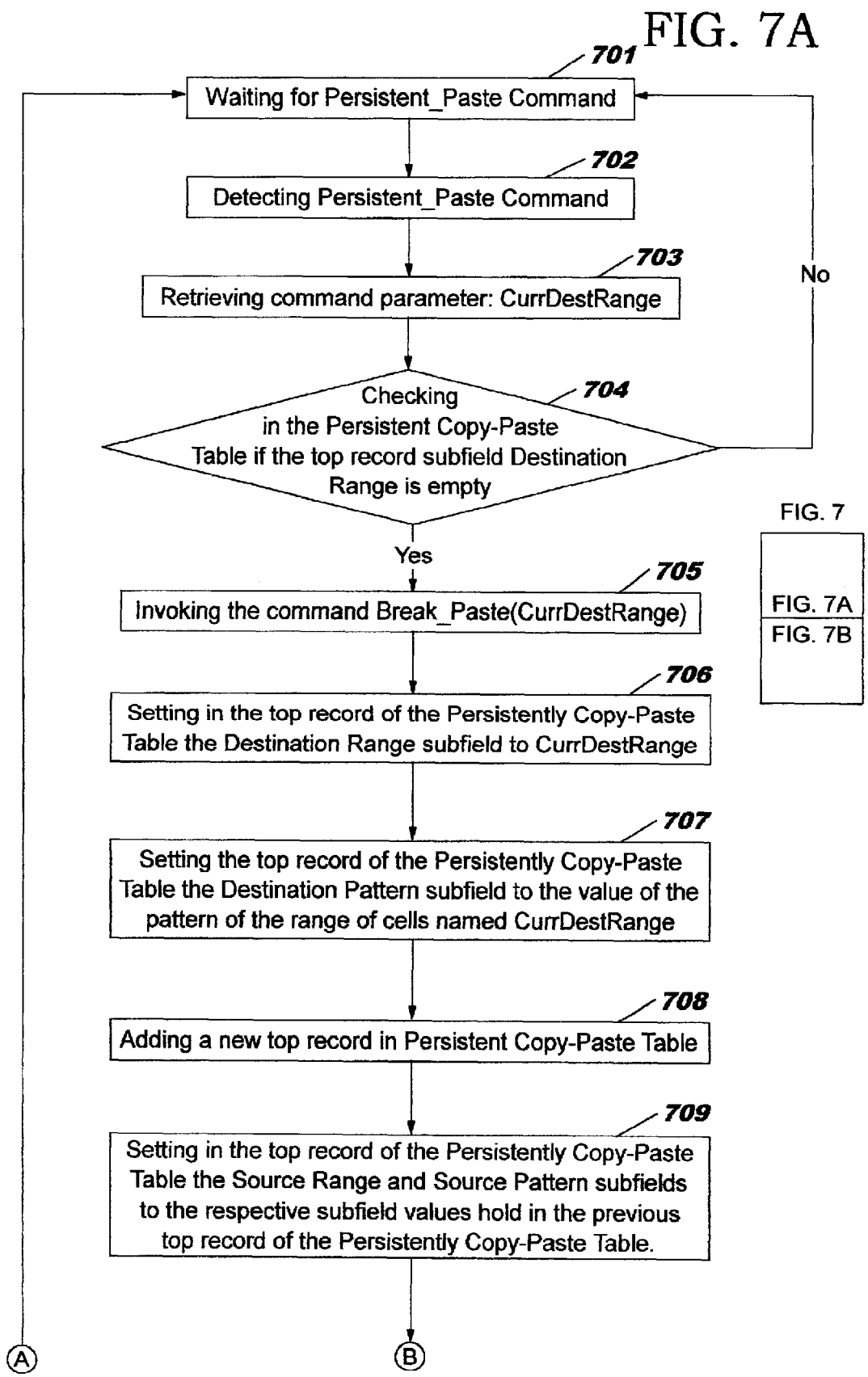

METHOD AND SYSTEM IN AN ELECTRONIC SPREADSHEET FOR PERSISTENTLY COPY-PASTING A SOURCE RANGE OF CELLS ONTO ONE OR MORE DESTINATION RANGES OF CELLS

FIELD OF THE INVENTION

The present invention relates to the field of information processing by digital computers, and more particularly to a method and system, in an electronic spreadsheet, for persistently copy-pasting a source range of cells onto one or more destination ranges of cells.

BACKGROUND

Before computers, numerical analyses, particularly financial ones, were usually prepared on an accountant s columnar pad or spreadsheet, with pencil and calculator in hand. By organizing data into columns and rows, spreadsheets afford the rapid assimilation of information by a reader. The task of preparing a spreadsheet on paper, however, is laborious. The process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a contiguous set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Cell ranges are used to automate computations in spreadsheets. Whether cells or cell ranges are named or not, they can be referenced within a formula either by a "relative" or an "absolute" reference. Such a reference can be the address of the referenced cell range, or the name of the referenced cell range if it turns that this cell range is named.

It is common to find in electronic spreadsheet based applications some large tables which are organised according to a structured way. This structure typically results in organising rows, columns and sheets in such a way that the content of each cell within a given column and within a given sheet can be obtained as the result of a copy-paste operation where the source copied cell is the top cell within this same column and same sheet. In such typical situations, this "reference" cell can contain a formula referencing in a relative or absolute way one or several other cells, so that each of the other cells within the same column of the same sheet will also contain the same formula where the absolute references will be kept unchanged and where the relative references will point to other relative cells.

Such a typical situation is illustrated in FIG. 3A where a table is used to compute a sales item price according to some input data. In this table, the content of the cell with address C6 (column entitled "Unit Cost") is for instance equal to formula "@CostOf(B6)" where @CostOf is a dedicated function providing the cost of an item used as parameter. In the same table, the content of the cell with address G6 (column entitled "Exchange rate") is for instance equal to formula "@RateOf(F6)" where @RateOf is a dedicated function returning the exchange rate for a currency passed as parameter. In the same table, the content of the cell with address I6 (column entitled "Price") is for instance equal to formula "C6*D6*G6/(1-$PROFIT)" where "PROFIT" is the name given to the cell range with address I3 where the profit figure is recorded. The content of each cell within the "Unit Cost" table can be obtained by copy-pasting the reference cell with address C6, so that the content of the cell with address Cx (where x takes the values 7 to 10) is equal to "@CostOf(Bx)". Similarly, the content of the cells with address Gx and with address Ix are obtained by copy-pasting the content of the reference cells with address G6 and with address I6, respectively. The content is equal respectively to "@RateOf(Fx)" and to "Cx*Dx*Gx/(1-$PROFIT)". The copy-paste operation is thus a powerful tool for copying in many different cells or ranges of cells, the content of a reference cell or of a reference range of cells. Nevertheless this copy-paste operation presents some limitations, as outlined hereafter.

Assume that in our example the content of a reference cell needs to be updated to reflect some structural change of the table it belongs to. This structural change is illustrated in FIG. 3B where the profit parameter (used to derive a price from a cost) is no longer constant for all sold items (as shown in FIG. 3A with the cell of address I3, and named "PROFIT"), but depends on the sold item itself, as represented in the table by the cells within the column entitled "Profit". Under this new rule, the content of the cell with address I6 (within the column entitled "Price") is now equal to formula "C6*D6*G6/(1−H6)". As the reference cell I6 for the "Price" column has been changed, reflecting the table structural update, it is necessary to reapply the copy-paste operation from this reference cell to all the other cells following the same logic, that is the cells with address I7 to I10 as shown in FIG. 3B. More generally, this operation must be carefully done each time a reference range of cells content is updated and must be applied to every range of cells whose content has been initially derived from the content of the reference range of cells through a copy-paste operation.

With large and complex spreadsheets, such an operation may take quite a long time and is error prone because the spreadsheet user may miss some of the ranges of cells where the copy-paste operation must be reapplied. When this happens, the resulting spreadsheet may provide erroneous results. The present invention offer a powerful and efficient solution to this problem by defining a method and a system for persistently performing a copy-paste operation between a reference range of cells and one or more destination ranges of cells.

SUMMARY OF THE INVENTION

The present invention relates to the field of information processing by digital computers, and more particularly to a method and system for persistently copying and pasting a source range of cells onto one or more destination ranges of cells, in a multi-dimensional spreadsheet. The method comprises the steps of:

performing a persistent copy operation that includes the steps of:
selecting a source range of cells; and
copying the source reference range of cells onto a buffer;

performing a persistent paste operation, that includes the steps of:
selecting one or more cells as a destination range of cells;
for each selected destination range of cells:
copying the content of the buffer onto the selected destination range of cells; and
associating the source range of cells with the destination range of cells;
automatically performing a copy operation each time the source range of cells is updated, where the copy operation includes the steps of:
determining whether the source range of cells is associated with one or more destination ranges of cells, and
If the source range of cells is associated with one or more destination ranges of cells, copying the source range of cells onto the associated destination ranges of cells.

BRIEF DESCRIPTION OF THE DRAWINGS

The invention will best be understood by reference to the following detailed description when read in conjunction with the accompanying drawings, wherein:

FIGS. 3A and 3B illustrate a typical spreadsheet structure used in a preferred embodiment of the present invention.

FIG. 4 illustrates the structure of the persistent copy-paste table, according to a preferred embodiment of the present invention.

FIGS. 6A and 6B show a flow chart illustrating a method for performing a persistent copy operation on a source reference range on cells, according to the present invention.

FIGS. 7A and 7B show a flow chart illustrating a method for performing a persistent paste operation on a destination range of cells, according to the present invention.

DETAILED DESCRIPTION

System Hardware

Figure 1A:
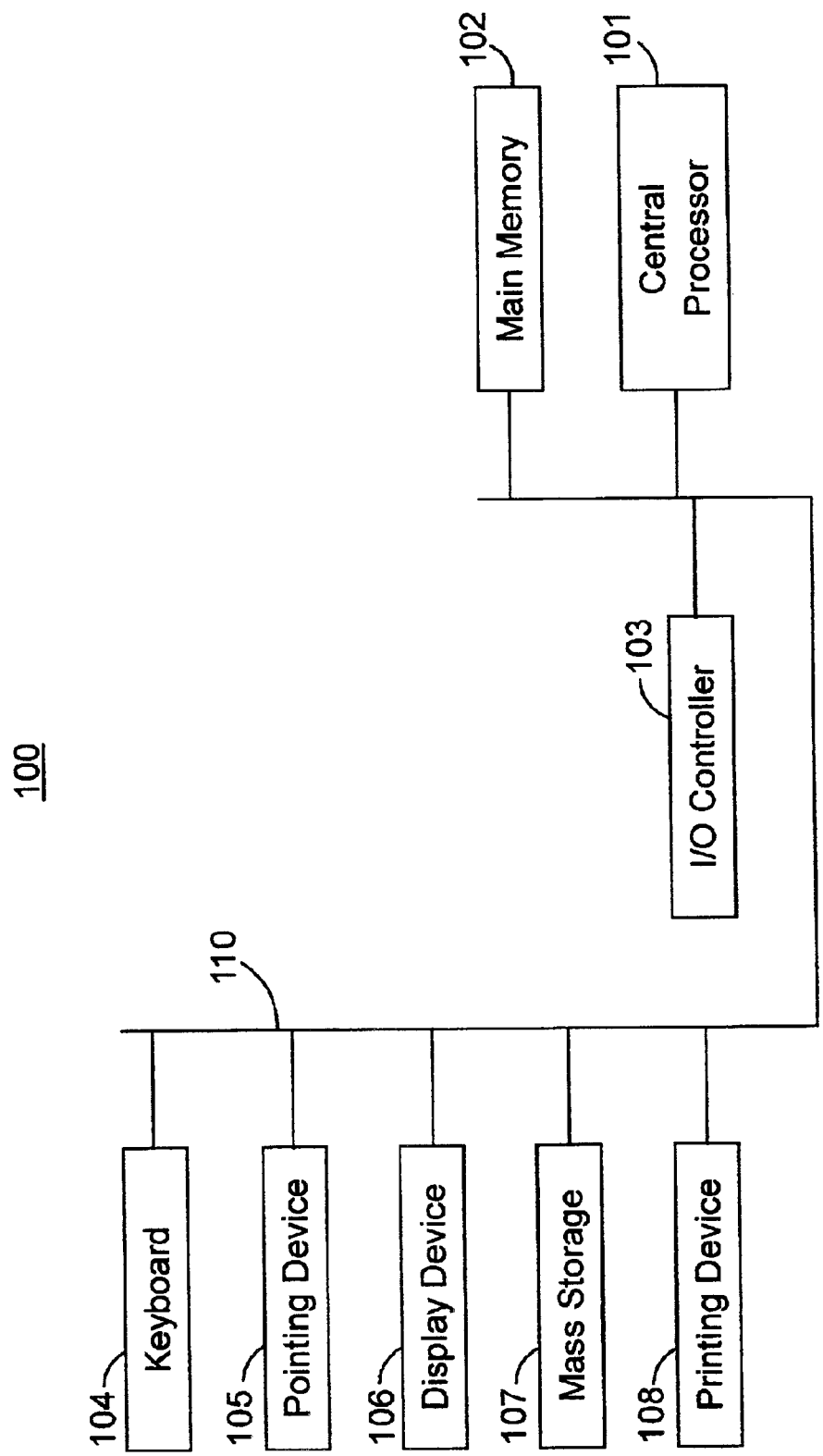
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
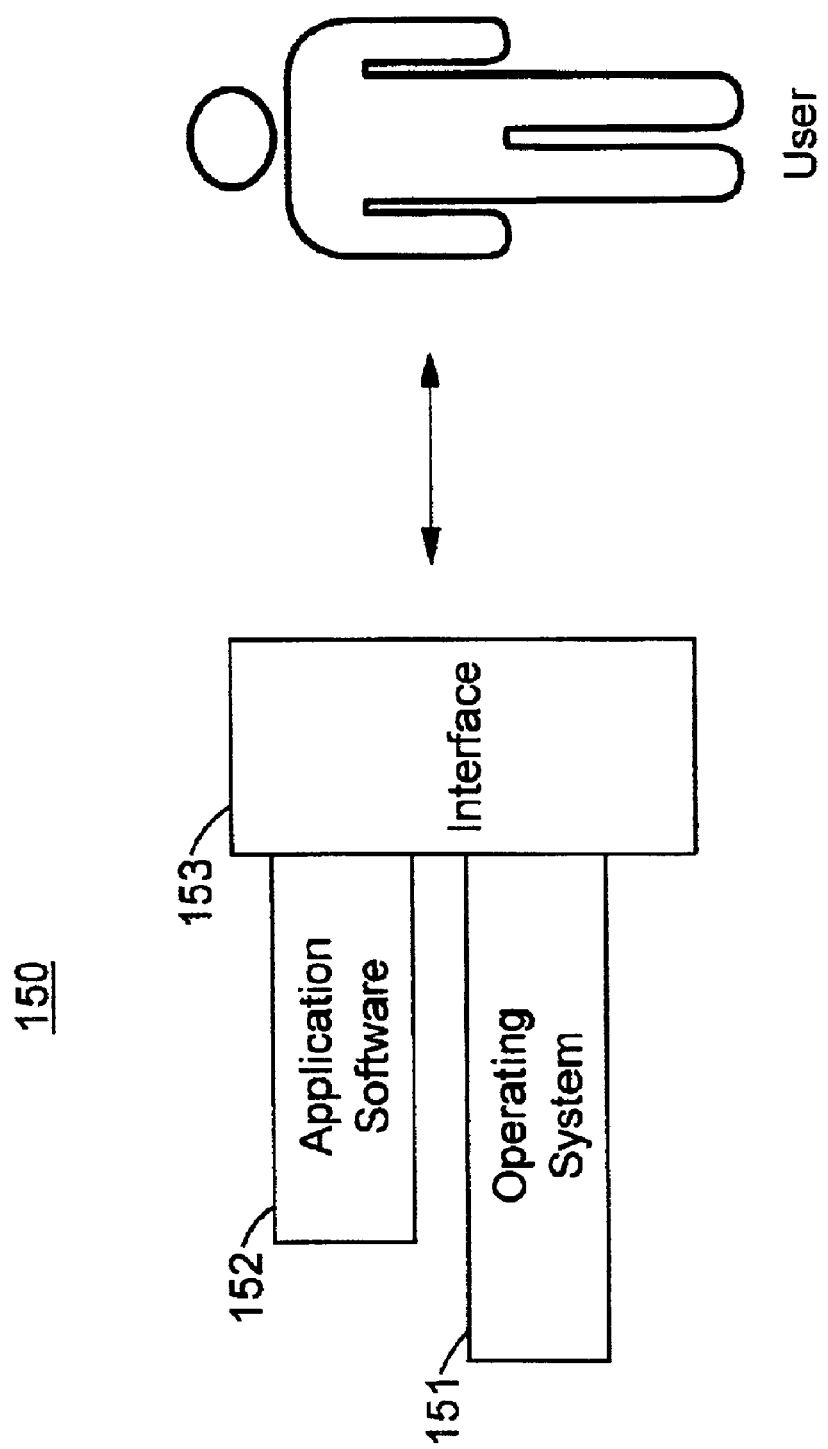
FIG. 1B is a schematic view a software system including an operating system, a software application, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating system 151 and/or application software 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application software 152, on the other hand, includes a spreadsheet notebook of the present invention as described in further detail herein below.

Interface

A. Introduction

The following description will focus on embodiments of the present invention that are included in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the descriptions of the exemplary embodiments which follows are for purposes of illustration and not limitation.

Figure 1C:
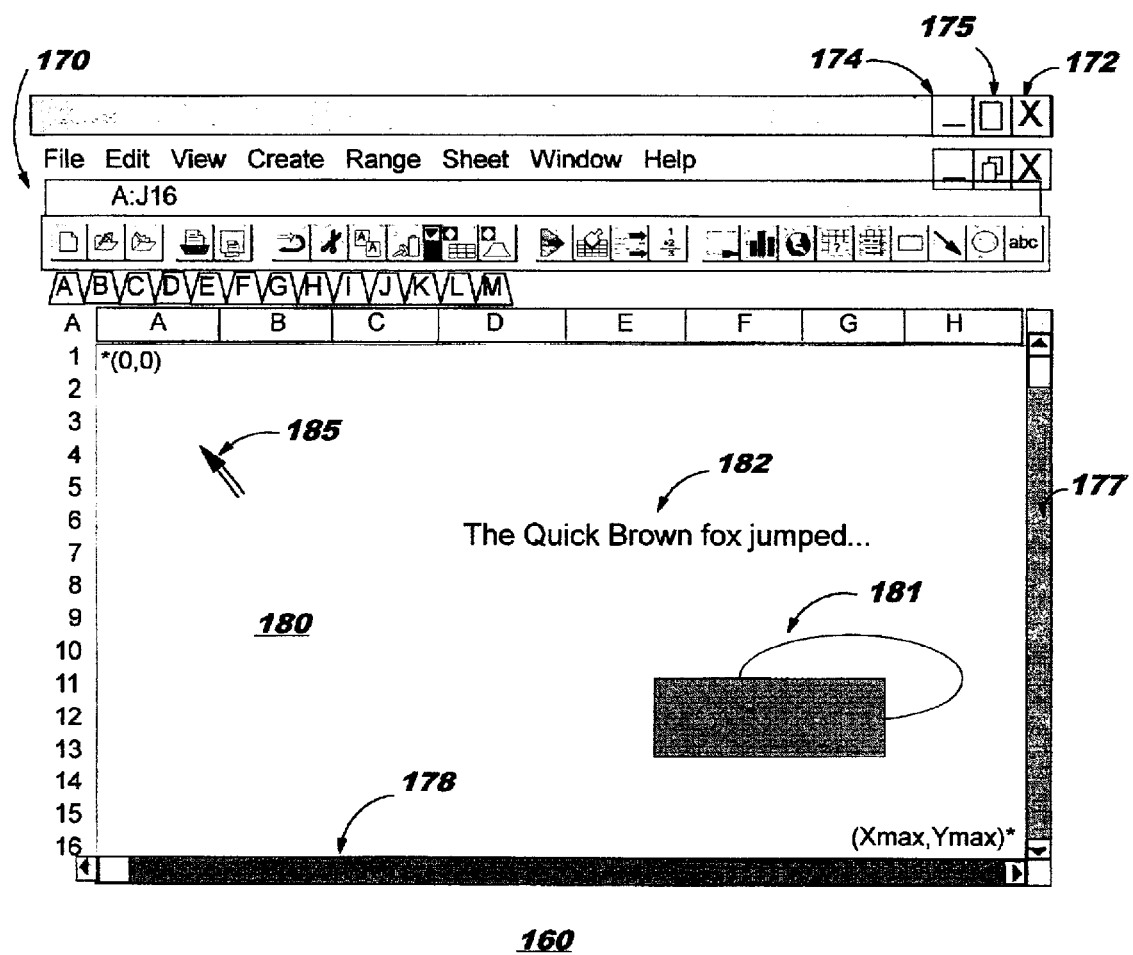
FIG. 1C illustrates the basic architecture and functionality of a graphical user interface in which the present invention may be embodied.

Referring now to FIG. 1C, the system 100 includes a workspace or window 160. Window 160 is a rectangular, graphical user interface (GUI) for display on screen 106; additional windows may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Window 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Microsoft Windows, is also known in the art: see, e.g., Petzold, C., *Programming Windows*, Second Edition, Microsoft Press, 1990. The disclosures of each are hereby incorporated by reference.

B. Preferred Interface

Figure 2A:
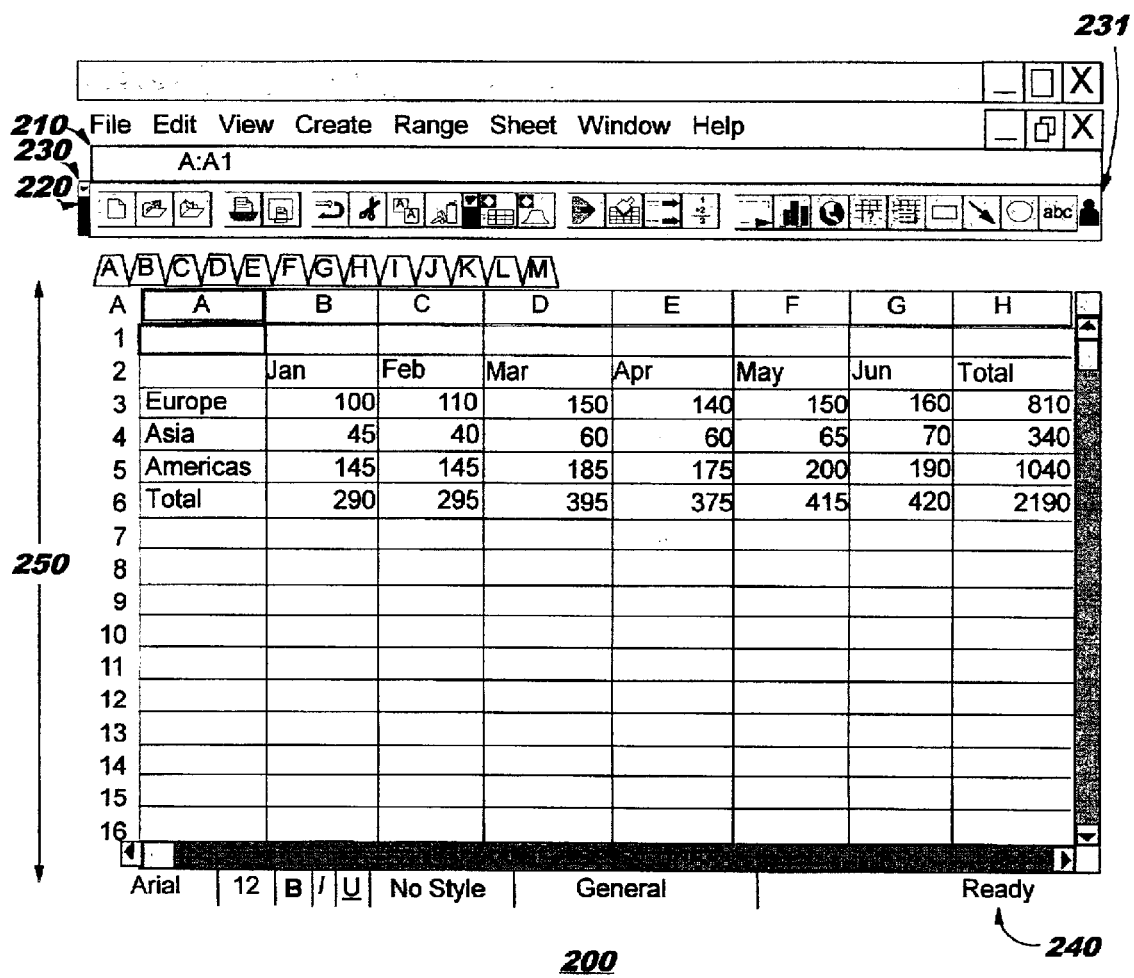
FIG. 2A shows a spreadsheet notebook interface according to a preferred embodiment of the present invention.

A spreadsheet notebook interface of the present invention will now be described. As shown in FIG. 2A, the spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
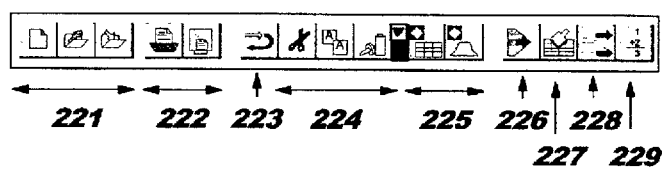
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a two-dimensional spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active cell (i.e., the cell that is currently selected).

Figure 2C:
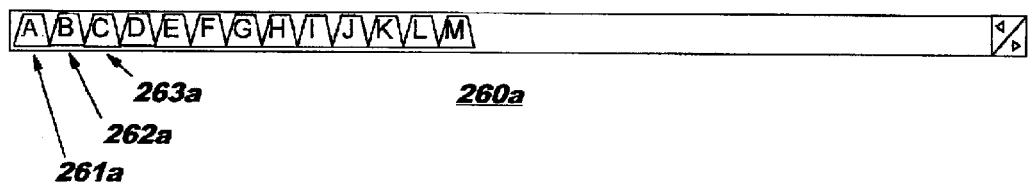
FIGS. 2C and 2D show page identifiers for rapidly accessing and manipulating individual pages of the notebook interface shown in FIG. 2A.
Figure 2D:
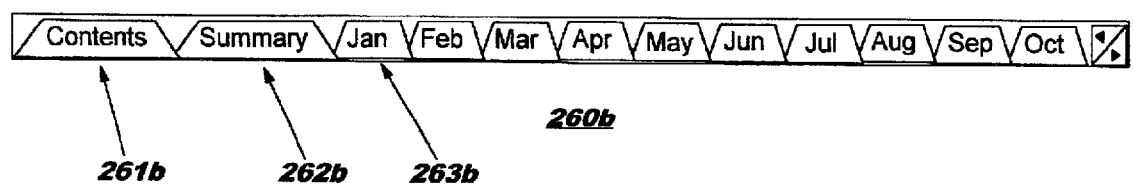

As shown in FIGS. 2C–D, individual notebook pages are identified by page identifiers 260, preferably located along one edge of a notebook. In a preferred embodiment, each page identifier is in the form of a tab member (e.g., members 261$a$, 262$a$, 263$a$) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261*a*, 262*a*, 263*a*) are respectively set to A, B, and C. Tab members are typically given descriptive names provided by the user, however. As shown in FIG. 2D, for example, the first three tab members have now been set to "Contents" (tab member 261*b*), "Summary" (tab member 262*b*), and "Jan" (tab member 263*b*). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve to aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (Getting Started, *User's Guide and Building Spreadsheet Applications*), available from Borland International.

Persistent Copy-paste Operation

A. Introduction

As the power of spreadsheet environments has increased over the last several years, it is possible today to develop complex custom applications based solely on spreadsheets, as opposed to applications developed with general purpose programming languages like C++ or VisualBasic from Microsoft Corporation. This can be done using spreadsheet imbedded tools such as macro languages, script languages, and formulas. In large spreadsheets, it is common to find structured tables where the content of some cells are directly derived from the contents of other cells using formulas which translate the relationship between these cells.

Such formulas can be quite complex. Consequently, it is advantageous to copy-paste such a formula, once established, from a reference cell onto all the other cells where the same relationship exists. If this relationship evolves during the life of a spreadsheet, however, then the spreadsheet user must first update the reference cell content (typically rewriting the formula it holds), and then the spreadsheet user must again perform a copy-paste operation between this source cell and all the cells whose content was previously obtained from the reference cell content with a copy-paste operation. In addition to the time spent by the user spreadsheet in performing this operation, there is a risk of applying this new copy-paste operation to the wrong set of cells: either some cells that need to be copy-pasted again may be missed, or some cells may be copy-pasted that should not be. In both cases, the resulting spreadsheet has been incorrectly updated, so that it provides erroneous results.

The present invention offers a user-friendly solution to this problem by defining a method and system that enables persistent copy-paste operations between a source reference range of cells and one or more destination ranges of cells.

B. Improved Copy-paste Manager

In contrast to the conventional tools just described, the present invention provides a more powerful, user-friendly and interactive approach for performing copy-paste operations using a copy-paste manager. The manager automatically allows the spreadsheet user to specify:

whether a copy-paste operation between a source reference range of cells and one or more destination ranges of cells must be done once, or whether the effect of a copy-paste operation between a source reference range of cells and one or more destination ranges of cells must persist after the operation, and whether the persistent relationship between the source reference range of cells and one or more destination ranges of cells must be broken.

For descriptive clarity, source reference ranges of cells which can take advantage of the present invention will be called "persistently clonable" ranges of cells, and destination ranges of cells which can take advantage of the present invention will be called "persistently cloned" ranges of cells.

C. Persistently Clonable/Cloned Ranges of Cells

In a preferred embodiment, persistently clonable and persistently cloned ranges of cells can be easily identified on the display device 106 within the work area 180 of the window 160 by using some specific cell attributes, such as a font style or font color or background color or border line style or border line color or background pattern, etc. In a preferred embodiment, the background pattern of a persistently clonable range of cells is set to a first pattern value referred to as PATTERN_COPY while the background pattern of a persistently cloned range of cells is set to a second pattern value referred to as PATTERN_PASTE. Furthermore, if a range of cells is the last one being persistently copied (this range of cells being referred to as the active persistently clonable range of cells), then its background pattern is set to a third value referred to as PATTERN_COPY_BLINK corresponding to the same pattern as those with value PATTERN_COPY, but in blinking mode.

D. Scenario

In a preferred embodiment, the present invention may be used in two steps:

The first step occurs when the spreadsheet user decides, based on criteria not developed here, whether a copy-paste operation performed between a source reference range of cells and one or multiple destination ranges of cells should take advantage of the copy-paste manager or not.

If so, the spreadsheet user executes in sequence the following steps.

First the spreadsheet user selects the relevant source reference range of cells by using conventional means such as (but not limited to) the pointing device 105 or the keyboard 104.

Figure 5A:
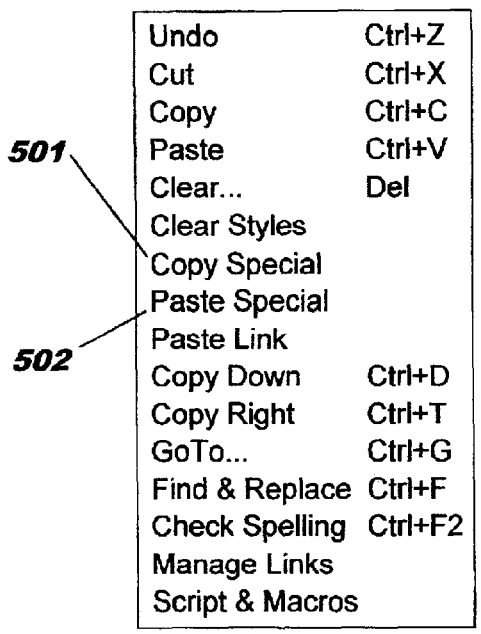
FIGS. 5A, 5B, 5C illustrate a spreadsheet user interface for invoking the persistent copy-paste operation, according to the present invention.
Figure 5B:
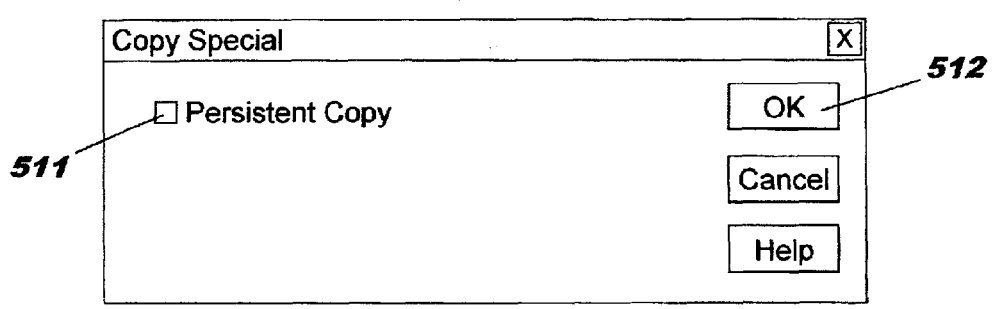

Then the spreadsheet user invokes an extension of the regular copy operation using conventional means available in spreadsheet environment, such as (but not limited to) dedicated push-buttons, keyboard entry short cuts, menu or sub menu entries. This extension of the regular copy operation corresponds to a specific command called "Persistent_Copy". In a preferred embodiment of the present invention, this Persistent_Copy command is invoked by clicking with the pointing device 105 first on a menu entry 501 "Copy Special" within the conventional "Edit" menu 500 of an electronic spreadsheet, as shown in FIG. 5A, and then on a specific check box 511 "Persistent Copy" present within a specific new dialog box "Copy Special" 510 as shown in FIG. 5B, and then on the "OK" push-button 512 available within this same dialog box "Copy Special" 510. At completion of the Persistent_Copy command, the background pattern of the source reference range of cells is set to the value PATTERN_COPY_BLINK, reflecting that it is now the active persistently clonable range of cells.

Then the spreadsheet user selects the relevant destination ranges of cells by using conventional means, such as (but not limited to) the pointing device 105 or the keyboard 104.

Figure 5C:
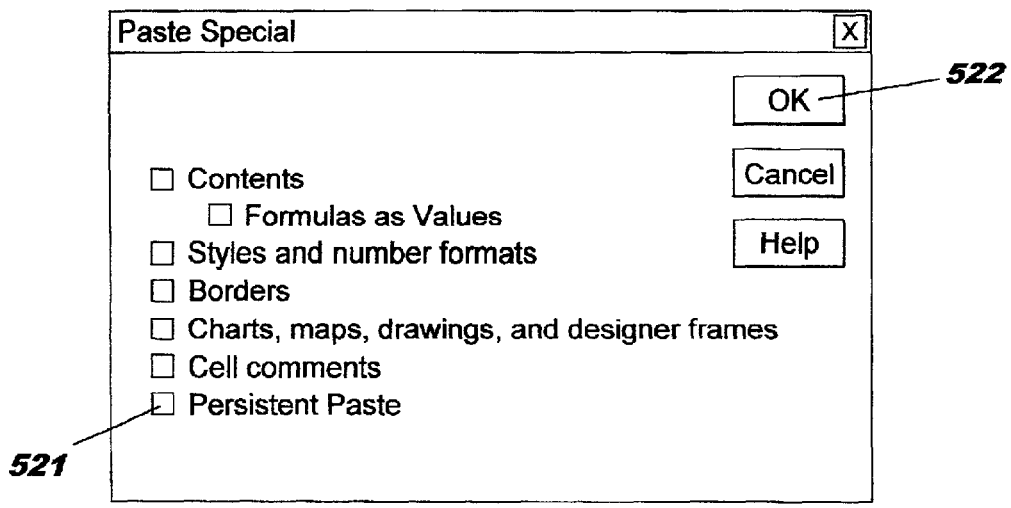

Then the spreadsheet user invokes a specific command called "Persistent_Paste" using conventional means available in spreadsheet environment, such as (but not limited to) dedicated push-buttons, keyboard entry short cuts, menu or sub menu entries. In a preferred embodiment of the present invention, the Persistent_Paste command is invoked by clicking with the pointing device 105 first on the conventional "Paste Special" menu entry 502 within the conventional "Edit" menu 500, as shown in FIG. 5A, and then on a specific check box 521 "Persistent Paste" introduced within the conventional "Paste Special" dialog box 520, as shown in FIG. 5C, and then on the "OK" push-button 522 available within this same dialog box "Paste Special" 510. At completion of the Persistent_Paste command, the background pattern of the destination ranges of cells is set to the value PATTERN_PASTE, reflecting that they are now persistently cloned ranges of cells.

If not, a regular copy-paste operation is performed between the source range of cells and the one or more destination ranges of cells.

The second step occurs when the spreadsheet user updates or deletes a cell belonging either to a persistently cloned range of cells or to a persistently clonable range of cells:

If the spreadsheet user updates the content of a cell belonging to a persistently clonable range of cells, the improved copy-paste manager invokes by itself a specific command called "Auto_Persistent_Copy_Paste" which automatically reflects this update in all the persistently cloned ranges of cells associated with the updated persistently clonable range of cells. This "Auto_Persistent_Copy_Paste" operation is fully automated, without involvement of the spreadsheet user, and is itself based on a copy-paste operation applied by the improved copy-paste manager between the updated persistently clonable range of cells and all the associated persistently cloned ranges of cells.

If the spreadsheet user updates the content of a cell belonging to a persistently cloned range of cells, the improved copy-paste manager invokes by itself a specific command called "Break_Paste" which breaks the relationship previously established between this range of cells and the persistently clonable range of cells it is derived from. As a result, the background pattern of the updated range of cells is reset to its initial value, and any future change of the persistently clonable range of cells will no longer be reflected in the current range of cells. Furthermore if the updated range of cells was the last persistently cloned range of cells associated to the persistently clonable range of cells, then this clonable range of cells returns to its initial state (it is no longer a clonable range of cells) so that its background pattern is reset to its initial value.

If the spreadsheet user deletes a cell belonging to a persistently clonable range of cells, the improved copy-paste manager invokes by itself a specific command called "Break_Copy" which breaks the relationship previously established between this range of cells and all the persistently cloned ranges of cells derived from it. As a result, the background patterns of the updated range of cells and of all the previously associated persistently cloned ranges of cells are reset to their initial values, and any future change of the current range of cells will no longer be reflected in the previously associated persistently cloned ranges of cells.

If the spreadsheet user deletes a cell belonging to a persistently cloned range of cells, the improved copy-paste manager invokes by itself the command "Break_Paste" which breaks the relationship previously established between this range of cells and the persistently clonable range of cells it is derived from. As a result, the background pattern of the updated range of cells is reset to its initial value, and any future change of the persistently clonable range of cells will no longer be reflected in the current range of cells. Furthermore if the deleted range of cells was the last persistently cloned range of cells associated to the persistently clonable range of cells, then this clonable range of cells returns to its initial state (it is no longer a clonable range of cells) so that its background pattern is reset to its initial value.

E. Persistent Copy-paste Table

The decision to perform a persistent copy-paste operation between a source reference range of cells and one or more destination ranges of cells belongs to the spreadsheet user. When this operation occurs, a common repository, called the "Persistent Copy-Paste Table", is used to record the required data. This Persistent Copy-Paste Table is preferably saved in a non volatile memory (typically but not necessarily part of the spreadsheet disk file on the mass storage 107).

Referring now to FIG. 4, the Persistent Copy-Paste Table 400 corresponds to a simple logical structure made of several records 401, each of which results from a persistent copy-paste operation. Each record includes four fields:

The "Source Range" 402 field is used for identifying uniquely the source reference range of cells within the spreadsheet. For instance, the Source Range may correspond to the conventional address structure. Sheet:RowColumn . . . Sheet:RowColumn associated with every range of cells (For example D:E10 . . . D:G20 with D as Sheet name, E and G as Row name/number, 10 and 20 as Column name/number).

The "Destination Range" 403 field is used for identifying uniquely the destination range of cells within the spreadsheet. For instance, the Destination Range may correspond to the conventional address structure Sheet:RowColumn . . . Sheet:RowColumn associated to every range of cells.

The "Source Pattern" field 404 records the pattern of the source reference range of cells, before execution of the persistent copy-paste operation.

The "Destination Pattern" field 405 records the pattern of the destination range of cells, before execution of the persistent copy-paste operation.

The record 410 located at the beginning of the Persistent Copy-Paste Table 400 is referred to as the top record.

In the preferred embodiment, the Persistent Copy-Paste Table 400 is explicitly included within the spreadsheet file itself, but other equivalent implementations can be used instead.

F. Methods

F.1 Persistent_Copy Method

Figure 6B:
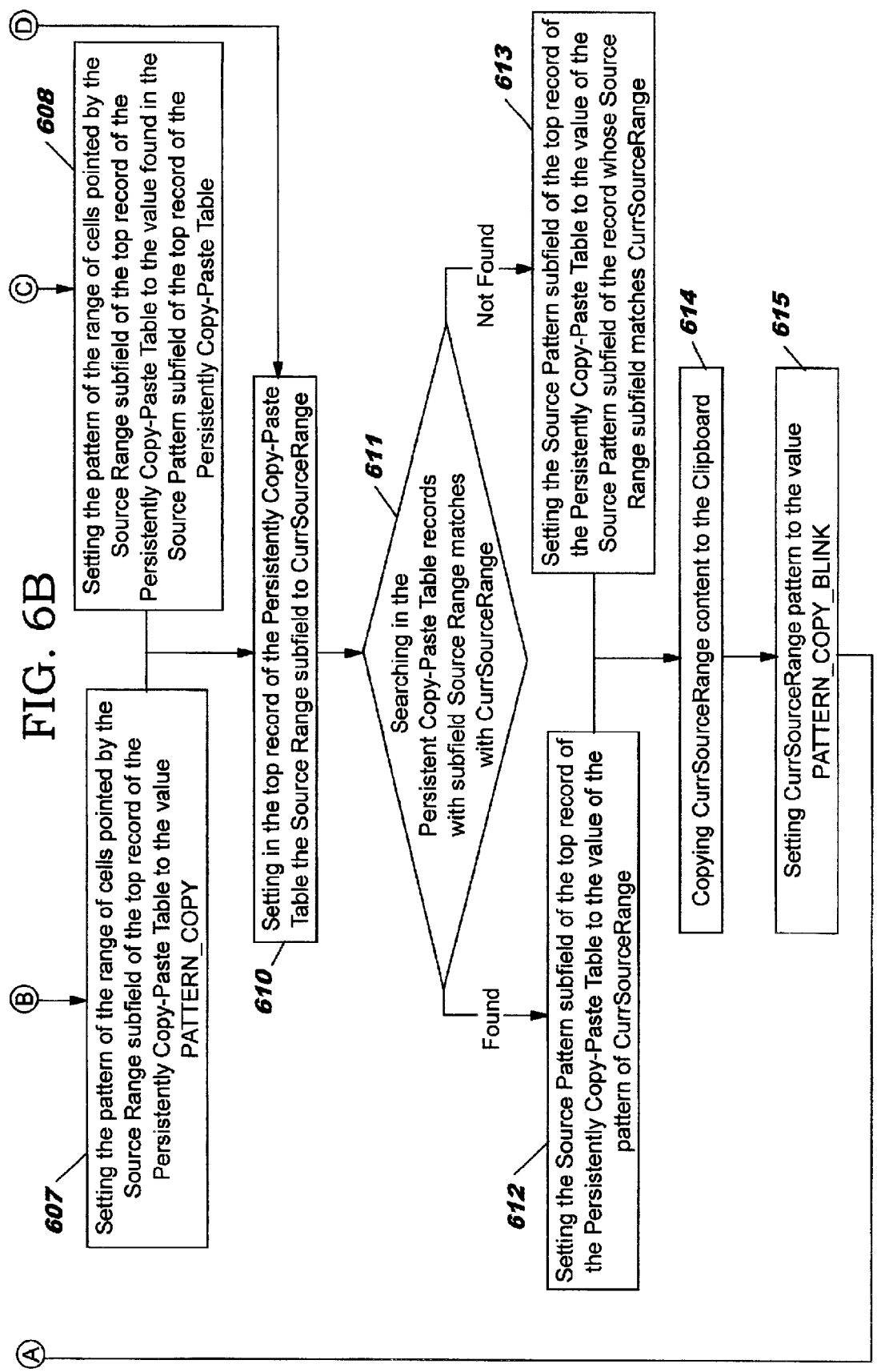

The method for turning a given range of cells into a persistently clonable range of cells to take advantage of the present invention is summarized in flowchart 600 of FIGS. 6A and 6B. This method may be thought of as the processing of the "Persistent_Copy" command. The method comprises the following steps:

At step 601, the method is in its default state, waiting for an event to initiate the process.

At step 602, an event is detected, as a result of a user action. This action may be, for example, a specific combination of keys on the keyboard 104, or the click of the pointing device 105 on a specific button, or any other equivalent action.

At step 603, the source reference range of cells, considered as a parameter of the Persistent_Copy command, is retrieved under the name CurrSourceRange.

At step 604, the method checks whether the "Destination Range" subfield 403 within the top record 410 of the Persistent Copy-Paste Table 400 is either void or filled with a specific value. If found void, then control is given to step 605; otherwise control is given to step 609.

At step 605, the method checks whether the "Source Range" subfield 402 within the top record 410 of the Persistent Copy-Paste Table 400 matches with the range of cells named CurrSourceRange. A match indicates that the current Persistent_Copy command is just a "replay" of the previous Persistent_Copy command. Control is given back to the initial step 601 to await a new Persistent_Copy command. Otherwise, control is given to step 606.

At step 606, the method checks whether there is any other record 401 within the Persistent Copy-Paste Table 400 whose "Source Range" subfield 402 matches the value of the "Source Range" subfield 402 of the top record 410 of the Persistent Copy-Paste Table 400. If a match is found, then control is given to step 607; otherwise control is given to step 608.

At step 607, the background pattern of the range of cells pointed by the "Source Range" subfield 402 of the top record 410 of the Persistently Copy-Paste Table 400 is set to the value PATTERN_COPY. Then control is given to step 610.

At step 608, the background pattern of the range of cells pointed by the "Source Range" subfield 402 of the top record 410 of the Persistently Copy-Paste Table 400 is set to the value found in the "Source Pattern" subfield 404 of the top record 410 of the Persistently copy-Paste Table 400. Then control is given to step 610.

At step 609, the Persistent Copy-Paste Table 400 is extended by introducing a new record 401 which becomes the top record 410 of this table.

At step 610, the "Source Range" subfield 402 of the top record 410 of the Persistent Copy-Paste Table 400 is set to the address of the range of cells named CurrSourceRange.

At step 611, the method checks whether there is any record 401 within the Persistent Copy-Paste Table 400 whose "Source Range" subfield 402 matches the address of the range of cells named CurrSourceRange. If a match is found, then control is given to step 613; otherwise control is given to step 612.

At step 612, the "Source Pattern" subfield 404 of the top record 410 of the Persistent Copy-Paste Table 400 is set to the value of the background pattern of the range of cells named CurrSourceRange. Then control is given to step 614.

At step 613, the "Source Pattern" subfield 404 of the top record 410 of the Persistent Copy-Paste Table 400 is set to the value of the "Source Pattern" subfield 404 of the record 401 found at step 611 where the "Source Range" subfield 402 matched with the address of the range of cells named CurrSourceRange.

At step 614, the content of the range of cells named CurrSourceRange is copied to the clipboard.

At step 615, the background pattern of the range of cells named CurrSourceRange is set to the value PATTERN_COPY_BLINK.

At step 616, the Persistent_Paste command is enabled. In a preferred embodiment of the present invention, this would entail enabling the "Persistent Paste" check mark 521 within the Paste Special dialog box 520. Then control is given back to the initial step 601 for handling a new command.

F.2. Persistent_Paste method

Figure 7B:
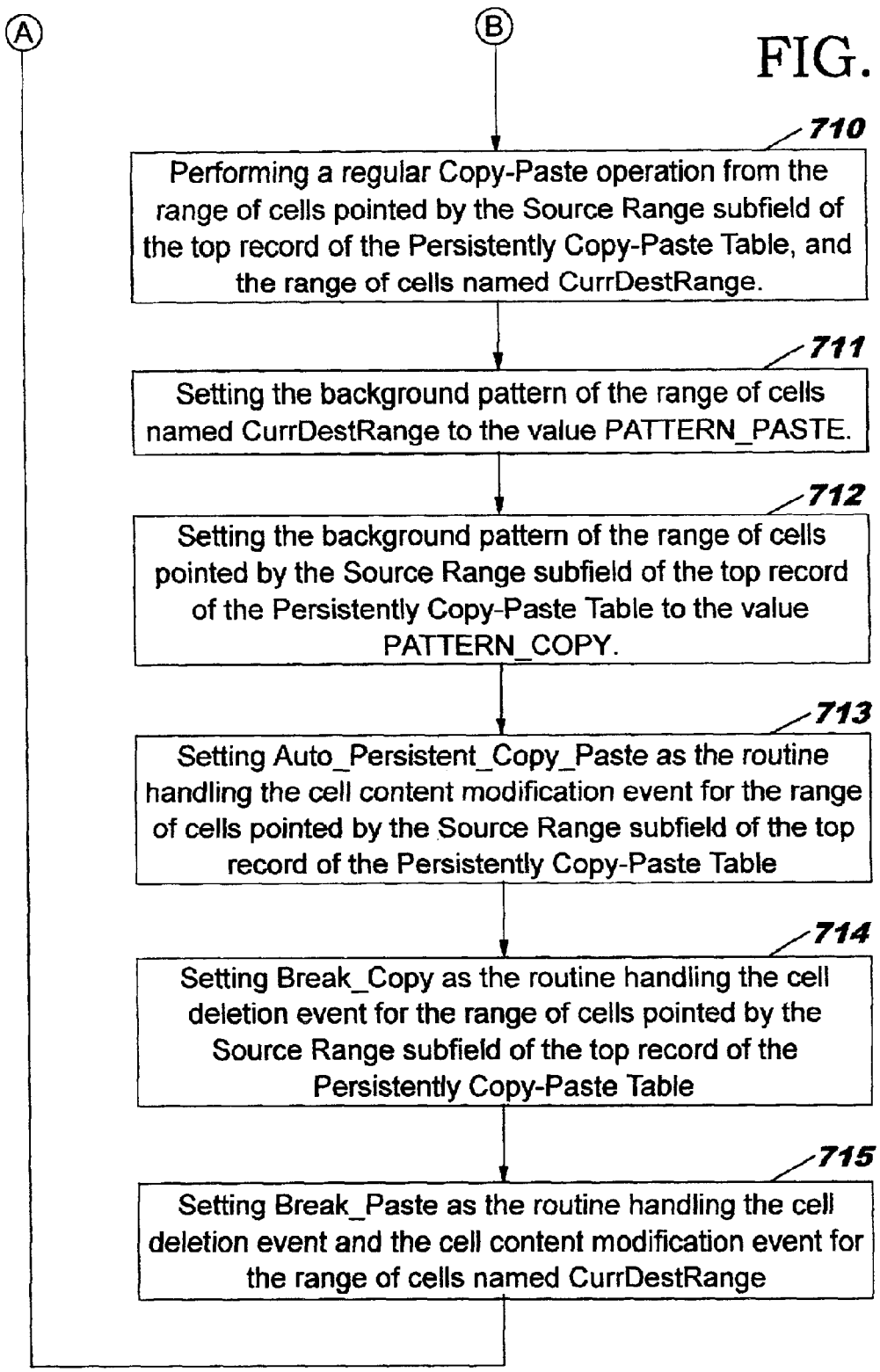

The method for turning a given range of cells into a persistently cloned range of cells to take advantage of the present invention is summarized in flowchart 700 of FIGS. 7A and 7B. This method can be thought of as the processing of the "Persistent_Paste" command. The method comprises the following steps:

At step 701, the method is in its default state, waiting for an event to initiate the process.

At step 702, an event is detected, as a result of a user action. This action may be, for example, a specific combination of keys on the keyboard 104, or the click of the pointing device 105 on a specific button, or any other equivalent action.

At step 703, the destination range of cells, considered as a parameter of the Persistent_Paste command, is retrieved under the name CurrDestRange.

At step 704, the method checks whether the "Destination Range" subfield 403 within the top record 410 of the Persistent Copy-Paste Table 400 is either void or filled with a specific value. If found void, then control is given to step 705; otherwise control is given back to the initial step 701 for handling a new command. Generally, the absence of a top record 410 with an empty "Destination Range" subfield 403 should not occur when the Persistent_Paste command is enabled.

At step 705, the command Break_Paste is invoked with CurrDestRange as parameter. This invocations deletes from the Persistent Copy-Paste table 400 any existing record 401 where the "Destination Range" subfield 403 corresponds to CurrDestRange.

At step 706, the "Destination Range" subfield 403 within the top record 410 of the Persistent Copy-Paste Table 400 is set to the address of the range of cells named CurrDestRange.

At step 707, the "Destination Pattern" subfield 405 of the top record 410 of the Persistent Copy-Paste Table 400 is set to the value of the background pattern of the range of cells named CurrDestRange.

At step 708, the Persistent Copy-Paste Table 400 is extended by introducing a new record 401 which becomes the top record 410 of this table.

At step 709, the "Source Range" subfield 402 and the "Source Pattern" subfield 404 of the new top record 410 of the Persistently Copy-Paste Table 400 are set to the respective values found in the same subfields of the record 401 which was the top record 410 of the Persistent Copy-Paste Table 400 before step 708.

At step 710, a regular Copy-Paste operation is performed from the range of cells identified by the "Source Range" subfield 402 of the top record 410 of the Persistently Copy-Paste Table 400, and the range of cells named CurrDestRange.

At step 711, the background pattern of the range of cells named CurrDestRange is set to the value PATTERN__PASTE.

At step 712, the background pattern of the range of cells identified by the "Source Range" subfield 402 of the top record 410 of the Persistently Copy-Paste Table 400 is set to the value PATTERN__COPY.

At step 713, the Auto__Persistent__Copy__Paste method is enabled as the routine handling the cell content modification event for the range of cells pointed by the "Source Range" subfield 402 of the top record 410 of the Persistently Copy-Paste Table 400.

At step 714, the Break__Copy method is enabled as the routine handling the cell deletion event for the range of cells pointed by the "Source Range" subfield 402 of the top record 410 of the Persistently Copy-Paste Table 400.

At step 715, the Break__Paste method is enabled as the routine handling the cell deletion event and the cell content modification event for the range of cells named CurrDestRange.

F.3. Auto__Persistent__Copy__Paste method

Figure 8:
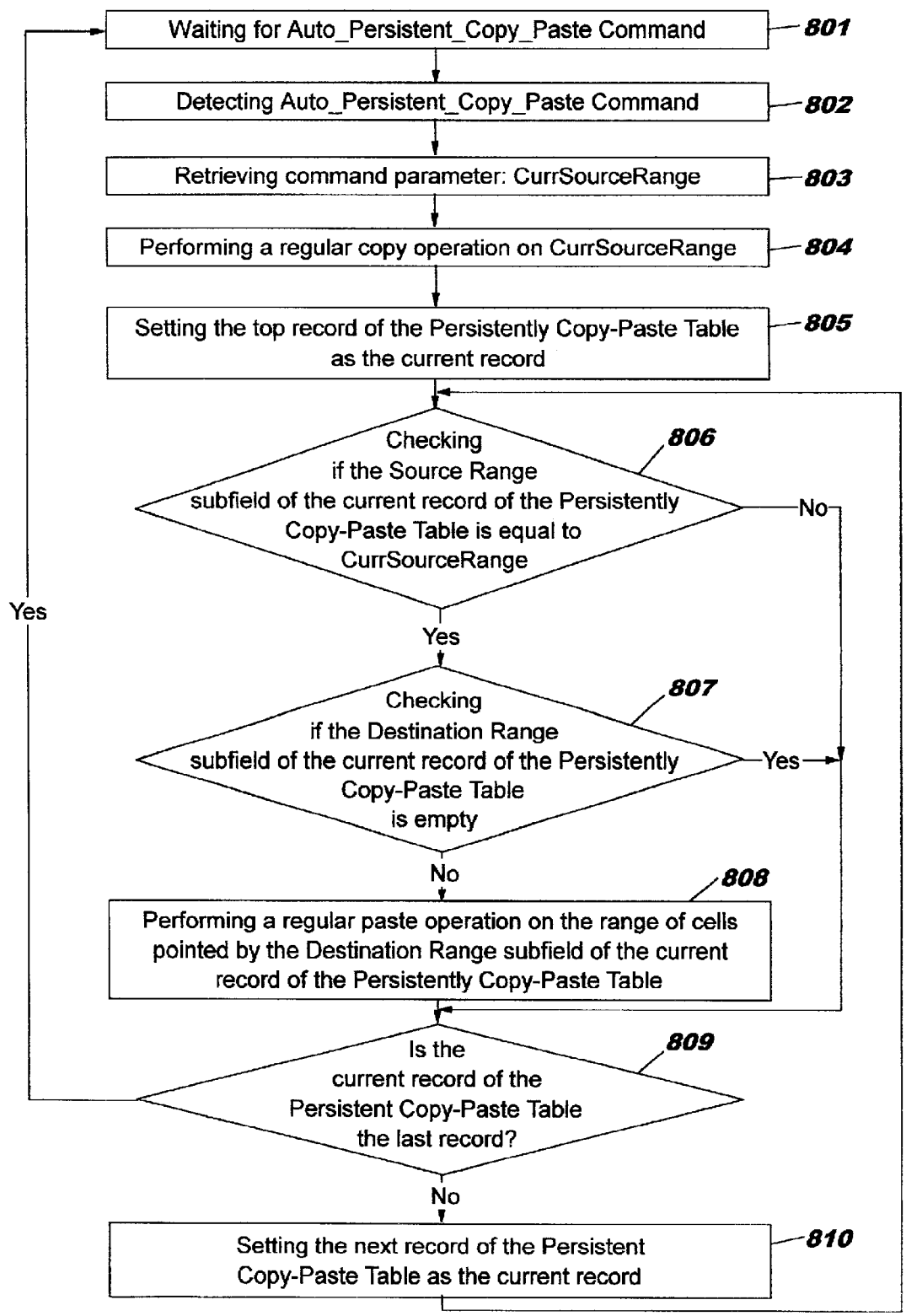
FIG. 8 is a flow chart illustrating a method for automatically performing a persistent copy-paste operation from a source reference ranges on cells onto multiple destination ranges of cells, upon modification of the content of the source reference range of cells, according to the present invention.

The method for automatically reflecting an update of the content of a persistently clonable range of cells onto one or more persistently cloned ranges of cells to take advantage of the present invention is summarised in flowchart 800 of FIG. 8. This method can be thought of as the processing of the "Auto__Persistent__Copy__Paste" command which is invoked each time the content of a persistently clonable range of cells is changed, as outlined in the step 713 of the Persistent__Paste method. The method comprises the following steps:

At step 801, the method is in its default state, waiting for an event to initiate the process.

At step 802, an event is detected, as a result of an update of the contents of a persistently clonable range of cells.

At step 803, the updated persistently clonable range of cells, considered as a parameter of the Auto__Persistent__Copy__Paste command, is retrieved under the name CurrSourceRange.

At step 804, a regular copy operation is performed on the range of cells named CurrSourceRange At step 805, the top record 410 of the Persistently Copy-Paste Table 400 is set as the current record 401 of the table.

At step 806, the "Source Range" subfield 402 of the current record 401 of the Persistently Copy-Paste Table 400 is compared against CurrSourceRange. If found equal, then control is given to step 807; otherwise control is given to step 809.

At step 807, the method checks whether the "Destination Range" subfield 403 of the current record 401 of the Persistently Copy-Paste Table 400 is empty. If it is empty, then control is given to step 809; otherwise control is given to step 808.

At step 808, a regular paste operation is performed on the range of cells identified by the "Destination Range" subfield 403 of the current record 401 of the Persistently Copy-Paste Table 400.

At step 809, a test is performed to determine whether the current record 401 of the Persistent Copy-Paste Table 400 is in fact the last record of this table. If it is the last record, then control is given to the initial step 801 for handling any future commands; otherwise control is given to step 810.

At step 810, the next record of the Persistent Copy-Paste Table 400 is set as the new current record 401 of this table. Then control is given to step 806.

F.4. Break__Copy method

Figure 9:
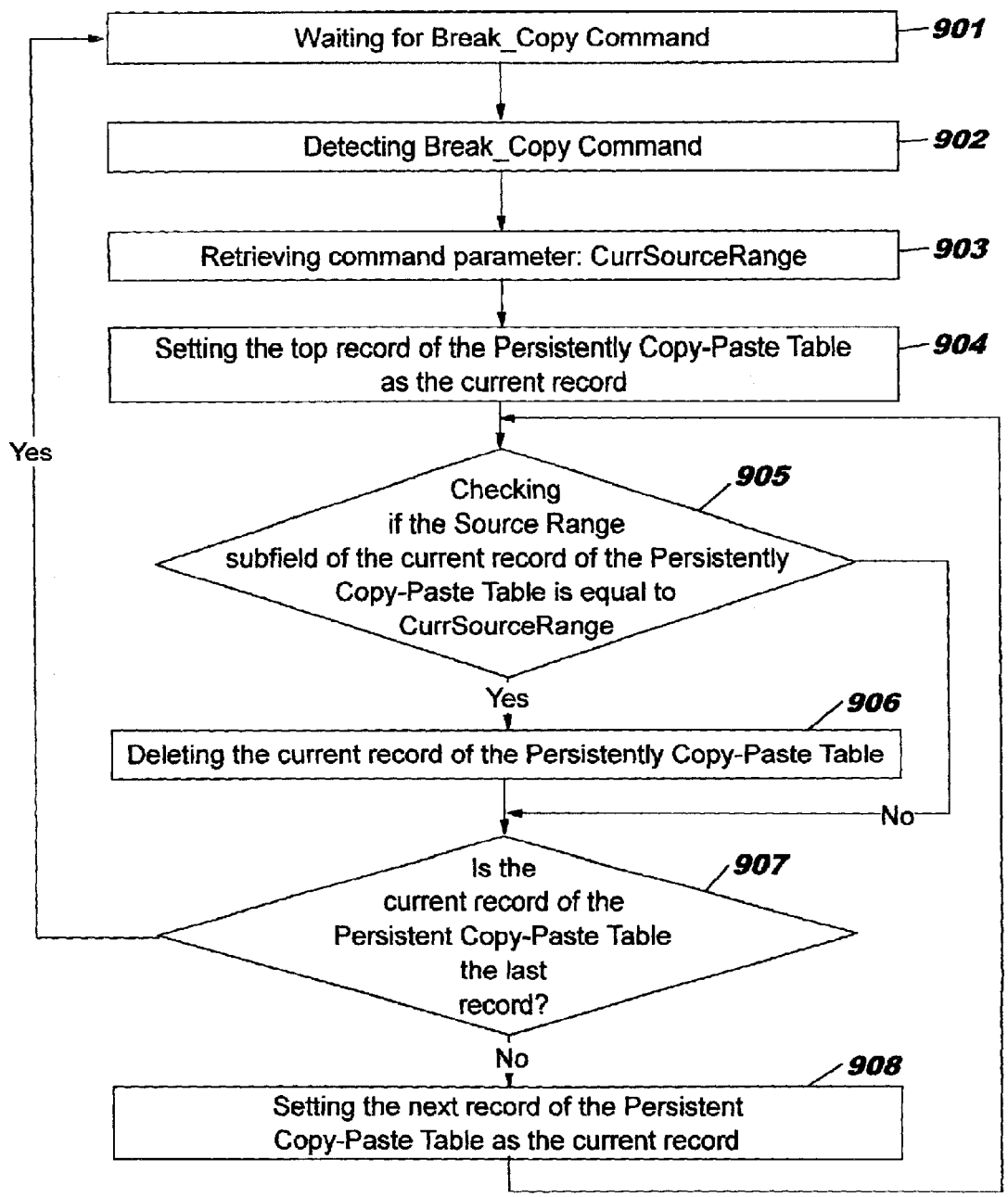
FIG. 9 is a flow chart illustrating a method for automatically handling the deletion of a source reference ranges on cells, according to the present invention.

The method for automatically reflecting the deletion of a persistently clonable range of cells to take advantage of the present invention is summarized in flowchart 900 of FIG. 9. This method can be thought of as the processing of the "Break__Copy" command which is invoked each time a persistently clonable range of cells is deleted, as outlined in the step 714 of the Persistent__Paste method. The method comprises the following steps:

At step 901, the method is in its default state, waiting for an event to initiate the process.

At step 902, an event is detected, as a result of the deletion of a persistently clonable range of cells.

At step 903, the deleted persistently clonable range of cells, considered as a parameter of the Break__Copy command, is retrieved under the name CurrSourceRange.

At step 904, the top record 410 of the Persistently Copy-Paste Table 400 is set as the current record 401 of the table.

At step 905, the "Source Range" subfield 402 of the current record 401 of the Persistently Copy-Paste Table 400 is compared against CurrSourceRange. If found equal, then control is given to step 906; otherwise control is given to step 907.

At step 906, the current record 401 of the Persistently Copy-Paste Table 400 is deleted. If it was not the first record of the table, then the previous record becomes automatically the new current record 401; otherwise the following record becomes automatically the new current record 401.

At step 907, a test is performed to determine whether the current record 401 of the Persistent Copy-Paste Table 400 is in fact the last record of this table. If it is the last record, then control is given to the initial step 901 for handling any new future commands; otherwise control is given to step 908.

At step 908, the next record of the Persistent Copy-Paste Table 400 is set as the new current record 401 of this table. Then control is given to step 905.

F.5. Break__Paste method

Figure 10:
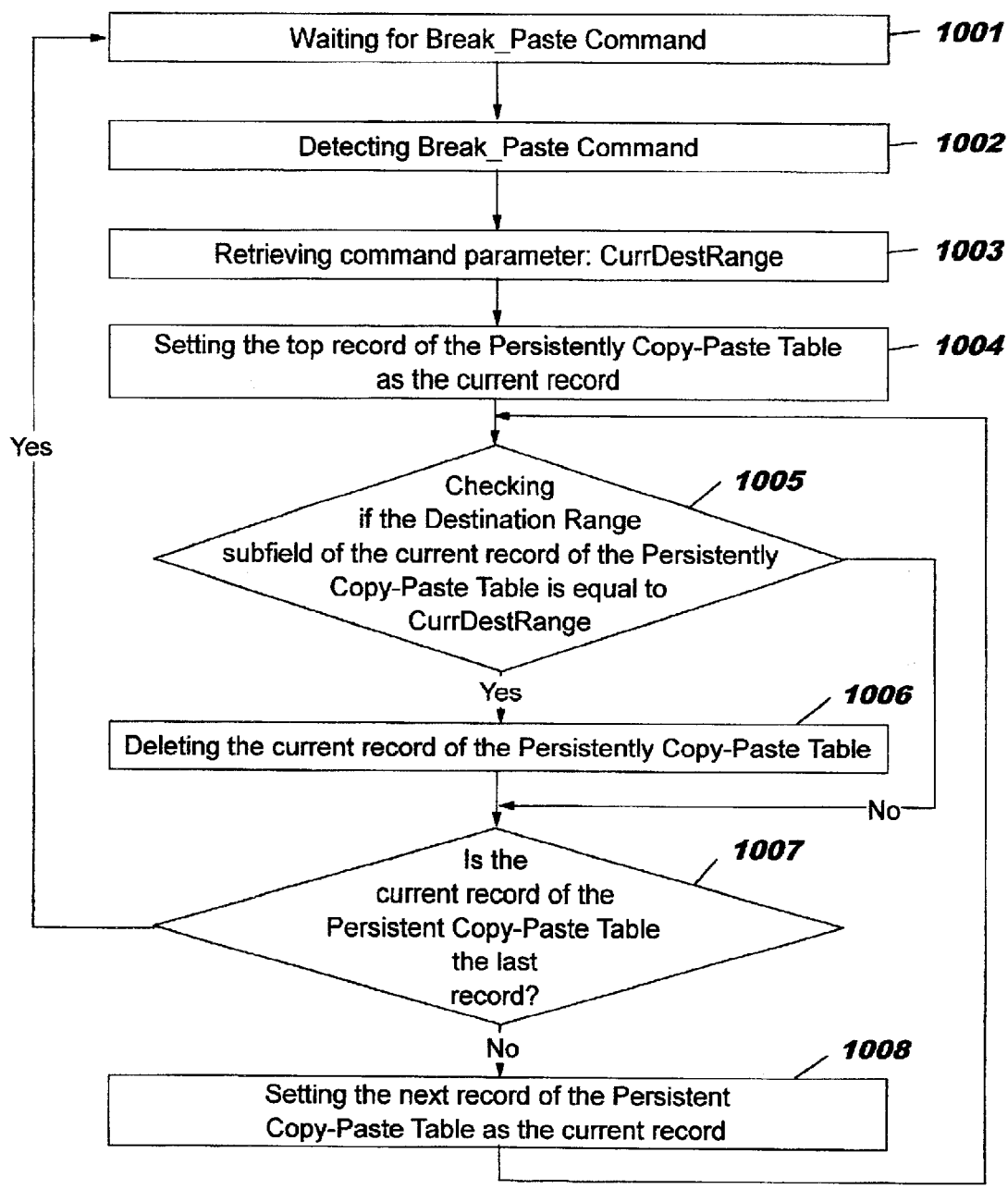
FIG. 10 is a flow chart illustrating a method for automatically handling the deletion or the content update of a destination range on cells, according to the present invention.

The method for automatically reflecting the deletion or the content update of a persistently cloned range of cells to take advantage of the present invention is summarised in flowchart 1000 of FIG. 10. This method can be thought of as the processing of the "Break__Paste" command which is invoked each time a persistently cloned range of cells is either deleted or content changed, as outlined in the step 715 of the Persistent__Paste method. The method comprises the following steps:

At step 1001, the method is in its default state, waiting for an event to initiate the process.

At step 1002, an event is detected, as a result of updating or deleting a persistently cloned range of cells.

At step 1003, the deleted or updated persistently cloned range of cells, considered as a parameter of the Break_Paste command, is retrieved under the name CurrDestRange.

At step 1004, the top record 410 of the Persistently Copy-Paste Table 400 is set as the current record 401 of the table.

At step 1005, the "Destination Range" subfield 403 of the current record 401 of the Persistently Copy-Paste Table 400 is compared against CurrDestRange. If found equal, then control is given to step 1006; otherwise control is given to step 1007.

At step 1006, the current record 401 of the Persistently Copy-Paste Table 400 is deleted. If it was not the first record of the table, then the previous record becomes automatically the new current record 401; otherwise the following record becomes automatically the new current record 401.

At step 1007, a test is performed to determine whether the current record 401 of the Persistent Copy-Paste Table 400 is in fact the last record of this table. If it is the last record, then control is given to the initial step 1001 for handling any future commands; otherwise control is given to step 1008.

At step 1008, the next record of the Persistent Copy-Paste Table 400 is set as the new current record 401 of this table. Then control is given to step 1005.

Alternate Embodiments

While the invention has been particularly shown and described with reference to a preferred embodiment, it will be understood that various changes in form and detail may be made therein without departing from the spirit, and scope of the invention.

The Persistent Copy-Paste method and system according to the present invention may be used advantageously in those environments where elements of information are organized as multidimensional tables having more than three dimensions.

What is claimed is:

1. A method comprising:

selecting a source range of cells in an electronic spreadsheet;

creating a persistent copy of cells that are in the source range of cells;

pasting the persistent copy of cells into a destination range of cells; and applying a source visual appearance attribute to the source range of cells, the source visual appearance attribute being removed from the source rage of cells only if a copy-paste manager invokes a break-paste command that breaks a relationship previously established between the source range of cells and the destination range of cells.

2. The method of claim 1, further comprising:

applying a destination visual appearance attribute to the destination range of cells that indicates that the destination range of cells contains a copy of the persistent copy of cells.

3. The method of claim 2, wherein the source visual appearance attribute applied to the source range of cells indicates that the persistent copy of cells has been created.

4. The method of claim 2, wherein the destination visual appearance attribute is a background pattern.

5. The method of claim 2, wherein the destination visual appearance attribute is a background color.

6. The method of claim 2, wherein the destination visual appearance attribute is a font style.

7. The method of claim 2, wherein the destination visual appearance attribute is a font color.

8. The method of claim 1, wherein the source visual appearance blinks if the persistent copy of cells is a most recently pasted group of cells to have been pasted into a destination range of cells in the electronic spreadsheet.

9. The method of claim 1, wherein the source visual appearance attribute is a background pattern.

10. The method of claim 1, wherein the source visual appearance attribute is a background color.

11. The method of claim 1, wherein the source visual appearance attribute is a font style.

12. The method of claim 1, wherein the source range of cells is a single cell.

13. A method of claim 1, further comprising:

storing the source range of cells and the destination range of cells in a persistent copy-paste table in a non-volatile memory.

14. The method of claim 1, wherein the source visual appearance attribute of the source range cells indicates that the persistent copy of cells has been created, and wherein the method further comprises:

applying a destination visual appearance attribute to the destination range of cells indicating that the destination range of cells contains a content of the persistent copy of cells.

15. The method of claim 14, further comprising:

storing the destination visual appearance attribute and the source visual appearance attribute in the non-volatile memory.

16. The method of claim 15, wherein the destination visual appearance attribute is a background pattern.

17. The method of claim 14, further comprising:

using a copy-paste manager to control copy and paste operations in the electronic spreadsheet, the copy-paste manager allowing a user of the electronic spreadsheet to select;

a single copy-paste operation between a source reference range of cells and one or more destination ranges of cells that is to be performed only once, or a persistent copy-paste operation between the source reference range of cells and one or more destination ranges may be performed multiple times using the persistent copy of cells.

18. The method of claim 17, further comprising a Graphical User Interface (GUI) that illustrates options to the user to select the single copy-past operation or the persistent copy-paste operation.

19. A computer program product residing on a computer usable medium, comprising:

program code for selecting a source range of cells in an electronic spreadsheet;

program code for creating a persistent copy of cells that are in the source range of cells;

program code for pasting the persistent copy of cells into a destination range of cells; and program code for applying a source visual appearance attribute to the source range of cells, the source visual appearance attribute being removed from the source range of cells only if a copy-paste manager invokes a break-paste command that breaks a relationship previously established between the source range of cells and the destination range of cells.

20. The computer program product of claim 19, further comprising:

program code for applying a destination visual appearance attribute to the destination range of cells that indicates that the destination range of cells contains a copy of the persistent copy of cells.

* * * * *

UNITED STATES PATENT AND TRADEMARK OFFICE
CERTIFICATE OF CORRECTION

PATENT NO. : 6,912,690 B2
DATED : June 28, 2005
INVENTOR(S) : Frederic Bauchot

It is certified that error appears in the above-identified patent and that said Letters Patent is hereby corrected as shown below:

<u>Column 15,</u>
Line 49, delete "rage" and insert -- range --.

Signed and Sealed this

Twenty-third Day of May, 2006

JON W. DUDAS
*Director of the United States Patent and Trademark Office*